United States Patent [19]
Belzer et al.

[11] Patent Number: 5,905,493
[45] Date of Patent: May 18, 1999

[54] COLOR CODED INSTRUCTIONAL SCHEME FOR COMPUTERS AND THE LIKE SYSTEM, METHOD AND ARTICLE OF MANUFACTURE

[75] Inventors: Robert S. Belzer, Crystal, Minn.; Andy J. Schatzberg, Encino, Calif.

[73] Assignee: Unalink Communications, Inc., Crystal, Minn.

[21] Appl. No.: 08/747,635

[22] Filed: Nov. 13, 1996

[51] Int. Cl.⁶ .................................................. G06F 3/00
[52] U.S. Cl. ........................................... 345/334; 400/487
[58] Field of Search .................................... 345/334, 335, 345/339, 346, 347, 348, 349, 352, 353, 354, 357, 156, 168, 172, 173; 400/486, 487; 341/22; 707/528; 364/709.01, 709.12, 709.15

[56] References Cited

U.S. PATENT DOCUMENTS

| | | | |
|---|---|---|---|
| 4,555,193 | 11/1985 | Stone | 400/486 |
| 4,853,878 | 8/1989 | Brown | 707/528 |
| 5,321,800 | 6/1994 | Lesser | 345/440 |
| 5,452,960 | 9/1995 | Kuhlenschmidt | 400/487 |
| 5,500,643 | 3/1996 | Grant | 341/22 |
| 5,500,794 | 3/1996 | Fujita et al. | 364/188 |
| 5,598,523 | 1/1997 | Fujita | 345/352 |
| 5,694,562 | 12/1997 | Fisher | 345/349 |
| 5,700,097 | 12/1997 | Kuhlenschmidt | 400/487 |

OTHER PUBLICATIONS

Brochure: "Sega Saturn," *NetLink* (1996).
Advertisement in periodical: *Details*, Dec. 1996, for Sega Saturn NetLink Product.

Stephen A. Booth, "Get Set for Futurevision," *Northwest Airlines, World Traveler*, Sep. 1996, pp. 24, 26, 28, 29.

Press Release: WebTV Networks Announces Array of New Investors for National Launch; Web TB Inter, Sep. 30, 1996, pp. 1–3.

*Primary Examiner*—Matthew M. Kim
*Assistant Examiner*—Crescelle N. dela Torre
*Attorney, Agent, or Firm*—Merchant, Gould, Smith, Edell, Welter & Schmidt, P.A.

[57] ABSTRACT

A color coded electronic user interface system is provided for use between an end user and a computer system. The system includes a graphical user interface that presents information to the user from the computer system on a display device. This information preferably includes instructional icons having associated therewith a computer system procedure from different predetermined functional categories and a color. In addition, a user input device receives user instructions for initiating computer system procedures. The user input device includes a function key having a color which corresponds to each of the instructional icons. Also, the system includes a controller which initiates the computer system procedure based on which function key is actuated. As a result, the user can associate and initiate computer system procedures based on a uniform color coding scheme of associated instructional icons and function keys. In addition, a color coded electronic user interface method and storage device readable by a computer system for implementing the method are provided.

24 Claims, 14 Drawing Sheets

COLOR CODED INSTRUCTIONAL SCHEME FOR COMPUTERS AND THE LIKE SYSTEM, METHOD AND ARTICLE OF MANUFACTURE

FIELD OF THE INVENTION

The present invention relates generally to a graphical user interface for facilitating the operation of computers and the like. More particularly, the present invention relates to a color coded interface for initiating a computer system procedure.

BACKGROUND OF THE INVENTION

For years, manufacturers have worked towards producing computing systems which assist our lives in a wide range of ways and allow us to perform a variety of different tasks with increased speed and ease. Generally speaking, such computing systems comprise a combination of electrical hardware components, including but not limited to microprocessors, which are interconnected and programmed to perform one or more specified functions. A user interface is provided, typically in the form of a keyboard or keypad arrangement in combination with an accompanying video graphics monitor or display unit, to allow the user to interact with and control the operations of the computing system. The software programming associated with such systems may be resident exclusively within the microprocessors or processing units, as is the case with a common calculator, or it may be selectively loaded into the internal memory of the system, as is the case with a typical personal computer. In this regard, the production of tailor-made software application programs for use with such personal computing systems has proliferated to the extent that it is possible to procure software capable of performing seemingly any task. For instance, programs for word processing, spread sheet/data-management, entertainment/video games, and accessing remote databases via the Internet are just a few prime examples of the different ways in which such computing systems pervade and improve our daily lives.

One of the main goals of manufacturers, of course, is to provide a system which is adequately powerful and sophisticated so as to allow a user to accomplish a host of ordinarily manual or mundane tasks in a quick and expedient fashion, while at the same time ensuring that the system is relatively simple, straightforward, and "user friendly" such that people can readily understand, grasp, and exploit the technology. By producing computing systems in this "user friendly" and inviting fashion, manufacturers serve the higher goal of increasing the user base for the particular system which, it will be appreciated, nay translate into increased profits and a more prominent presence in the marketplace. The efforts undertaken thus far in this regard have focused primarily on providing simplifications to either the keyboard/keypad assemblies, or the various screen displays generated by the computing system and displayed on the video graphics monitors or display modules. Once again, these simplifications are provided to make the computing system more "user friendly" such that a greater number of people can operate and master the particular computing system.

First with regard to the keyboard/keypad assemblies, perhaps the most common and long-standing simplification effort involves the use of function keys (F1, F2, F3, etc.), which are provided on the keyboard and preprogrammed to perform a host of macro operations with the striking of a single key. The use of these function keys effectively minimizes the number of keystrokes necessary to accomplish a given task, thereby simplifying the operation of the application program for the end user. However, while this simplification arrangement does reduce the number of keystrokes required to accomplish a given task, there is still a substantial amount of memorization that must be undertaken to master what operation is performed by each function key. Moreover, it is typical that the definition associated with each particular function key changes in meaning depending upon where the user is operating within the overall application software program. This, of course, further adds to the complexity of operating the computing system in that it requires memorizing not only the primary operation to be carried out by each function key, but also the multitude of secondary operations which can be performed by each particular function key. To overcome the disadvantage of having to undertake such laborious memorization measures, various template arrangements have been provided in close proximity to the function keys so as to identify the various operations performed by each function key. Providing such a template arrangement, however, can detract from the ergonomic appearance of the computing system and, moreover, presents the possibility of becoming lost or displaced such that the user will be unable to adequately identify the appropriate function keys for the desired operations in the absence of the template.

Another drawback of this arrangement is that the simplification is merely one dimensional, with the improvement being restricted to the keyboard/keypad assembly itself and not offering any supplemental improvement or simplification to the screen display. Although this technique effectively reduces the number of interactions necessary to perform a specified function, there is little or nothing on the screen which further aids the user in managing the operation of the computing system. This lack of direction and instruction may be especially troublesome for those individuals who are either inexperienced or uncomfortable with computers and related technology in that they may still be incapable of mastering the particular application program notwithstanding the simplification offered by the preprogrammed function keys.

With the commercialization of the Internet and the ever increasing gap between those individuals who are computer literate and computer illiterate, it is of paramount importance that the available technology be made as simple, straightforward, and approachable so that every man, woman, and child is capable of operating and mastering such computing systems.

Many other attempts at simplifying keyboard/keypad arrangements have been made which focus more directly on facilitating the mechanical operation of such computing systems. For example, keyboards have been developed which are capable of being operated with one hand. Also, a scheme for color coding a keyboard has been taught where the keyboard is subdivided into one or more fields with actuation of two keys from the same field concurrently representing a particular character in the alphabet. However, these efforts at simplifying the physical operation of a computing system are essentially one dimensional in that the improvement is confined to the keyboard/keypad assembly itself and is not tied to other parts of the user interface such as the visual screen display or the pointing device (e.g., mouse, trackball or trackpad). A need exists for an easier interface to a computing system which incorporates all of the elements of the user interface such that individuals who are unfamiliar and/or phobic of computing systems will be more inclined to work with such systems.

Another keyboard/keypad simplification technique has been taught for use with children. This particular simplification involves a color coded computer keyboard for facilitating the operation of application programs by children. In this regard, each particular set of keys are color coded according to their function. For example, the alphabet keys are a first color, the numbered keys are a second color, the function keys are a third color, etc. However, this color coding arrangement merely assists the children in grouping each set of keys according to color and does not eliminate the substantial amount of memorization that must be performed to master the multiple definitions attached to the various function keys. These memorization requirements further add to the complexity of operating the computing system in that the user is still required to memorize not only the primary operation to be carried out by each function key, but also the multitude of secondary operations which can be performed by each particular function key. Moreover, this simplification technique is one dimensional with the improvement being narrowly tailored to the keyboard/keypad assembly without any supplemental simplification on the screen display. As noted above, such a technique merely addresses a select portion of the greater problem of making the operation and control of technologically sophisticated computer systems a realizable goal for an ordinary, inexperienced computer user.

Turning now to the video graphics monitors and display units, probably the most common simplification technique involves setting forth pictorial representations on the screen display (i.e., icons) which serve as shorthand instructional aids for each particular function. By incorporating the use of a mouse, joystick, or similar device, the various icons on the screen displays may be "clicked" upon or otherwise selected so as to initiate a given function without the need for any keystrokes on the keyboard or keypad arrangement. For example, it is typical to provide instructional icons containing pictures of a printer, a pair of scissors, and a computer disc to graphically represent the computer functions of printing, cutting/editing text, and saving a file, respectively. Thus, to initiate any of these functions, a user need only click upon the appropriate pictorial instructional icon. However, as with the aforementioned simplification techniques, this icon arrangement suffers the disadvantage of being one dimensional and, therefore, inadequate. This simplification technique differs from those previously enumerated in that the improvement is confined to the video graphics monitor/display unit, rather than the keyboard/keypad assembly. As such, a void exists in the user interface in that there are no guiding features on the keyboard which correspond to and complement the pictorial instructional icons illustrated on the video graphics monitor or display unit. Once again, this one dimensional simplification effort merely addresses a portion of the greater problem of producing computing systems which are truly "user friendly" and non-threatening to computer novices.

Another simplification technique for involving color has been taught which involves a user inputting information to a computer using colors by typing a filename in a specified color that the application interprets and performs a specific function related to that color. Similarly, the technique involves assigning color to data elements, wherein the particular color indicates what specific function, attribute, or value should be associated with the given data element. By associating a color with the filename and/or data element, the specific functions to be performed can be communicated to the computing system without the overhead of additional keystrokes or character information. However, the technique as taught changes the meanings attached to the various colors used throughout the application program depending upon where the user happens to be in the program. As such, a given color may have several different meanings associated therewith which, again, adds to the complexity of learning and operating such a computing system. This, of course, cuts directly against the general need to keep things an simple as possible to appeal to novice computer users.

A need therefore exists for an improved user interface scheme for computing systems and the like which provides a two dimensional simplification technique with substantive improvements to both the keyboard/keypad assembly and the screen displays on the video graphics monitor or display units such that the particular computing system is easy to learn, master, and operate for any potential user, regardless of their level of experience with computers and high technology. By presenting a two dimensional simplification technique which is simple, straightforward, and easy to learn with complementary improvements to both the keyboard/keypad assembly and the screen displays, such an user interface scheme will advantageously serve to narrow gap between those individuals who are computer literate and computer illiterate such that a larger number of individuals will be capable of operating and mastering such computing systems.

A need also exists for an improved user interface scheme for computing systems and the like which is relatively simple, straightforward, and "user friendly" so an to minimize the amount of memorization and/or study effort required to operate and master said computing systems. By providing such a "user friendly" simplification technique, this will advantageously ensure that people can readily understand, grasp, and master the particular computing system so as to exploit the available technology. Moreover, providing such a "user friendly" instructional scheme will also advantageously serve the higher goal of increasing the user base for the particular system, potentially translating into increased profits and an elevated market presence.

The present invention provides a solution to this and other problems, and offers other advantages over the prior art.

SUMMARY OF THE INVENTION

The present invention relates to a graphical user interface that has a color coded scheme for screen display icons and function keys which solve the above-mentioned problems.

In accordance with one embodiment of the present invention, a color coded electronic user interface system is provided for use between an end user and a computer system. The system includes a graphical user interface that presents information to the user from the computer system on a display device. This information preferably includes instructional icons having associated therewith a computer system procedure from different predetermined functional categories and a corresponding color. In addition, the system includes a user input device that receives data input by the user from which user instructions for initiating a computer system procedure and other user input is obtained. The user input device includes a function key which corresponds in color to each of the instructional icons. Also, the system includes a controller which initiates the computer system procedure from one of the different predetermined functional categories based on which function key is actuated on the user input device by the user. As a result, the user can associate and initiate computer system procedures based on a uniform color coding scheme of associated instructional icons and function keys.

The present invention also can be implemented as a color coded electronic user interface method and storage device readable by a computer system for implementing the color coded electronic user interface method.

These and various other features as well as advantages which characterize the present invention will be apparent upon reading of the following detailed description and review of the associated drawings.

DETAILED DESCRIPTION

Figure 1:
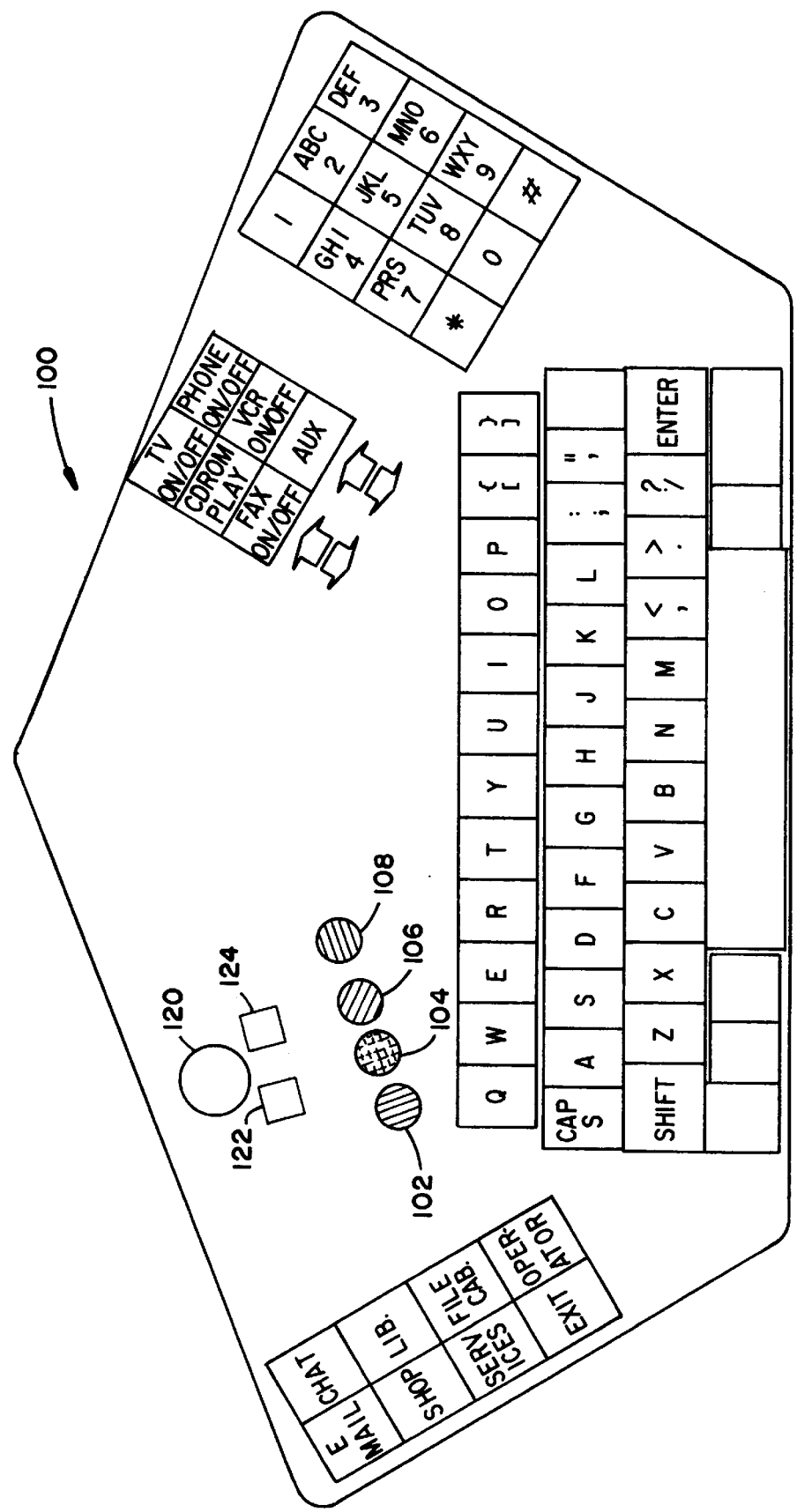
FIG. 1 is top plan view of a keyboard assembly which employs a plurality of colored function keys in accordance with a preferred embodiment of the present invention.

In a preferred embodiment of the present invention, an improved user interface for computing systems and the like is provided for facilitating the smooth and efficient operation of a computing system by all potential users regardless of their level of experience. More particularly, the improvement of the present invention lies in providing a color coded arrangement having colored function keys provided on a keyboard/keypad assembly in combination with correspondingly colored instructional icons provided upon each screen display generated on the video display unit of the computing system. In other words, for every colored function key provided on the keyboard/keypad assembly there is a corresponding instructional icon provided on the screen display which has the exact same predominate color as the particular function key.

In an important aspect of this preferred embodiment, each color is assigned a definition which remains universal throughout the entire operation of the computing system such that the selection of a particular color, via function key or instructional icon, is interpreted by the computing system in the exact same fashion to initiate/perform the exact same function. By defining each color in a universal fashion and matching each colored function key to an identically colored instructional icon, the preferred embodiment allows a user to quickly and easily learn to operate the particular computing system through simple color association.

The color coded user interface may be employed in virtually every type of computing system having visual display capability and a keypad arrangement. The visual display capability may be achieved in any number of different fashions, including a standard video graphics display monitor or similar display unit attached to the computing system, or a display module formed as an integral part of the computing system. In the most typical situation, the keypad arrangement will consist of a plurality of individual keys disposed on a keyboard, wherein the keyboard is physically attached to the computing system via a connecting cable or similar transmission line. However, those skilled in the art will fully appreciate that a similar keypad arrangement may be provided on a hand-held remote control unit capable of communicating with the computing system via radio frequencies (RF), infra-red, or a similar transmission medium without the need for any connecting cable extending between the computing system and the remote control unit. While the color coded user interface is limited to computing systems having visual display capability and a keypad arrangement, there are no corresponding limitations as to the functions or purposes that such computing systems are designed to perform or effectuate. As such, the user interface of the present invention may be employed in any number of different types of computing systems. By way of illustration and not limitation, the following detailed description will reference the color coded user interface employed with a computing system for accessing the Internet. However, as will be discussed in more detail later, this user interface can be adapted for use on a variety of electronic appliances or consumer goods without departing from the scope and spirit of the present invention.

Referring first to FIG. 1, shown is a top plan view of a keyboard assembly 100 for use with an Internet access device (not shown). The Internet access device, although not illustrated, works in conjunction with a household television (TV) set and phone line such that the TV set serves as a would-be "computer screen" and the phone line serves as the communication link to the Internet. The key components of the Internet access device include: (1) a network communication console (not shown), which is microprocessor-based and connected between the phone line and the TV set; and (2) the keyboard assembly 100, which is attached to the network communication console (not shown) for allowing a user to control the various functions of the Internet access device. The microprocessors disposed within the network communication console are programmed to perform a number of different tasks while the computing system is attached to the Internet. More specifically, these microprocessors are programmed to generate a plurality of different screen displays on the TV screen depending upon the application and the particular choices made by the user.

In an effort to simplify the operation of the Internet access device, the improved instructional scheme of the present invention provides a bank of colored function keys 102, 104, 106, 108 disposed on the keyboard assembly 100 in conjunction with a bank of correspondingly colored instructional icons 112, 114, 116, 118 disposed on each of the screen displays illustrated in FIGS. 2–12. By way of example only and not limitation, the bank of colored functions keys includes a red function key 102, a yellow function key 104, a green function key 106, and a blue function key 108. With reference to FIGS. 2–12, each of the screen displays illustrated contains a corresponding red instructional icon 112, a yellow instructional icon 114, a green instructional icon 116, and a blue instructional icon 118.

The meaning attached to each color remains the same regardless of which screen display the user happens to be viewing in any given software application or executable program. For example, in the preferred embodiment shown, the color red is defined so that it always means "exit" to allow the user to quickly exit the Internet, the color yellow in defined so that it always means "go back to the main menu," the color green is defined so that it always means "new topic," and the color blue is defined so that it always means "search" to initiate a search. By providing this dedicated uniform color coding scheme, the user may quickly and efficiently navigate about the Internet by simply pressing the colored function keys 102, 104, 106, 108 and/or by employing a mouse 120 with left 122 and right 124 buttons, a joystick, or other selection device to select between the various colored instructional icons 112, 114, 116, 118 on each screen. The principal concept, once again, is that each color designates a particular operation or navigational activity that is universal throughout every screen display of the application. It will be appreciated, therefore, that this color coded user interface makes it simple for a user to traverse through the various screen displays so as to effortlessly operate and master the Internet access device.

As noted above, FIGS. 2–12 illustrate various screen displays generated by the application program within the Internet access device and displayed on the video display unit. The application software of the Internet access device preferably is programmed to break down the activities available on the Internet into four main constituent user interface subject areas: (1) CHAT, for engaging in on-line conversations with other Internet users; (2) SHOPPING, for taking advantage of the multitude of merchandising opportunities an the Internet; (3) LIBRARY, for researching from the wealth of information available on the Internet; and (4) SERVICES, for utilizing the various services offered on the Internet. Based on the foregoing overview, the following description will further detail the dedicated color scheme of the present invention, wherein each color is assigned a specific definition that remains universal throughout the entire application such that the selection of a particular color, via function key and/or instructional icon, will initiate a particular operation or function regardless of where the user is in the overall operation of the computing system.

Figure 2:
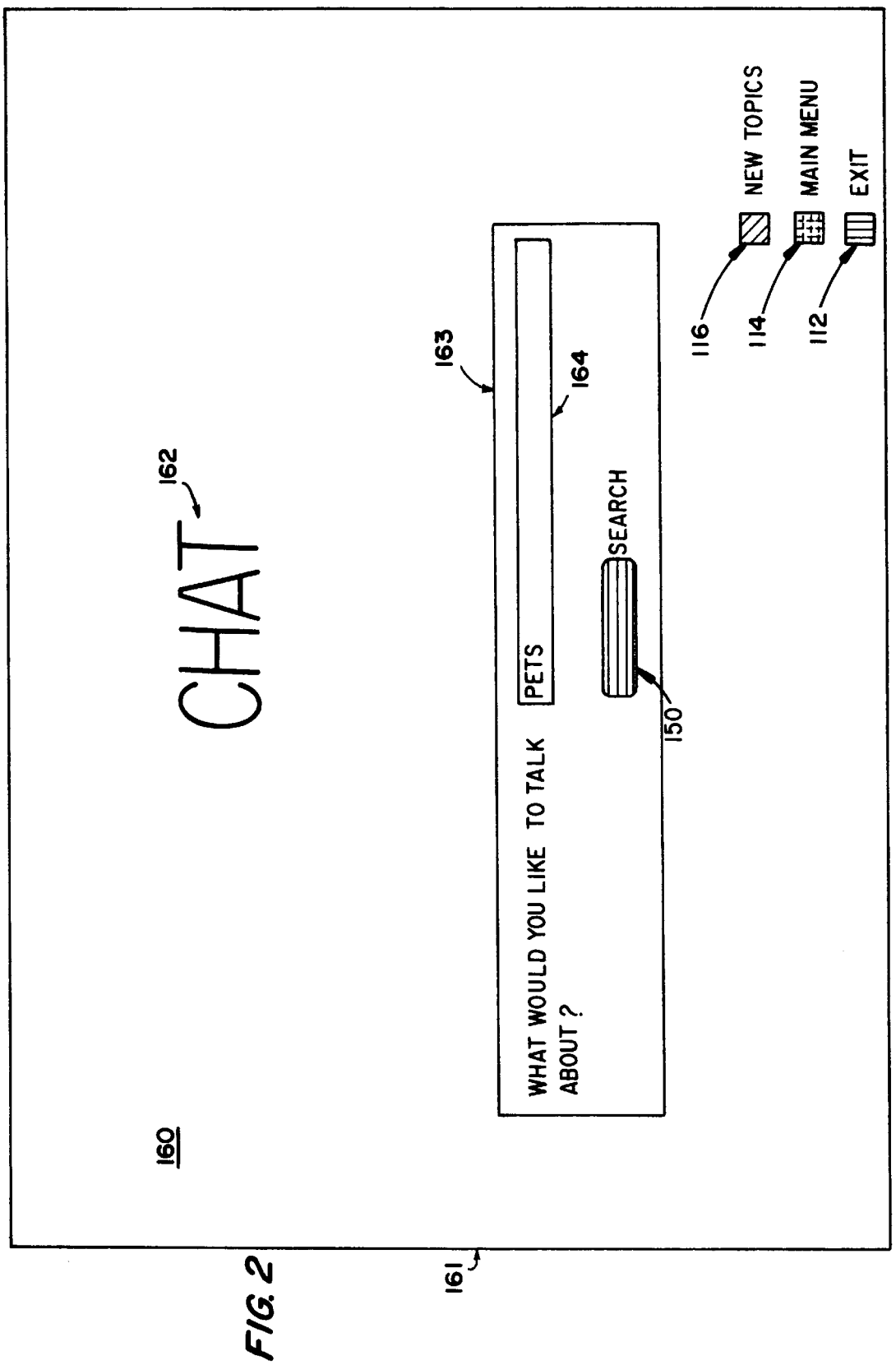
FIG. 2 is an illustration of a primary screen display as shown on a video graphics monitor or similar display unit, having a plurality of colored instructional icons disposed thereon in accordance with the preferred embodiment of the present invention.

With specific reference to FIG. 2, shown is a primary screen display 160 for the CHAT main subject heading. As noted above, this primary screen display is generated by the programmed microprocessors within the Internet access device and displayed on a video display unit which, in this case, is a television screen. The television screen is represented generally by a border 161 and includes therewithin a heading title 162, a query module 163, and the colored instructional icons 112, 114, 116, 118 of the present invention. As shown, the query module 163 contains a message prompt asking the user what subject they would like to talk about in combination with a data entry module 164 for communicating the desired subject heading to the application software within the Internet access device. By way of example and not limitation, the query module 163 also contains the blue instructional icon 118 which, as noted earlier, is defined to initiate a search function within the application software of the Internet device. To engage in an on-line conversation requires the first step of inputting a search request into the data entry portion 164 of the query module 163. This can be accomplished by typing the search request through the use of the attached keyboard assembly 100 shown in FIG. 1, or by selecting the characters to be input using a mouse, a joystick, or similar selection device from a bank of available characters provided on the screen display itself. Either way, the next step involves initiating the actual search.

The search may be initiated by using the blue instructional icon 118 or the blue function key 108. This is because the blue function key 108 and the blue instructional icon 118 form an instructional set wherein the selection of either initiates the search function. In similar fashion, individual instructional sets are formed by matching the red function key 102 with the red instructional icon 112, the yellow function key 104 with the yellow instructional icon 114, and the green function key 106 with the green instructional icon 116. An such, the specific function associated with each of the available colors may be quickly and easily initiated through the use of either the function key or the instructional icon of each of these color coded instructional sets. For instance, by selecting either the blue function key 108 shown in FIG. 1 or the blue instructional icon 118 of FIG. 2, the Internet access device will initiate a search on the subject which was input into the data input portion 164 of the query module 166 (i.e., pets).

Figure 3:
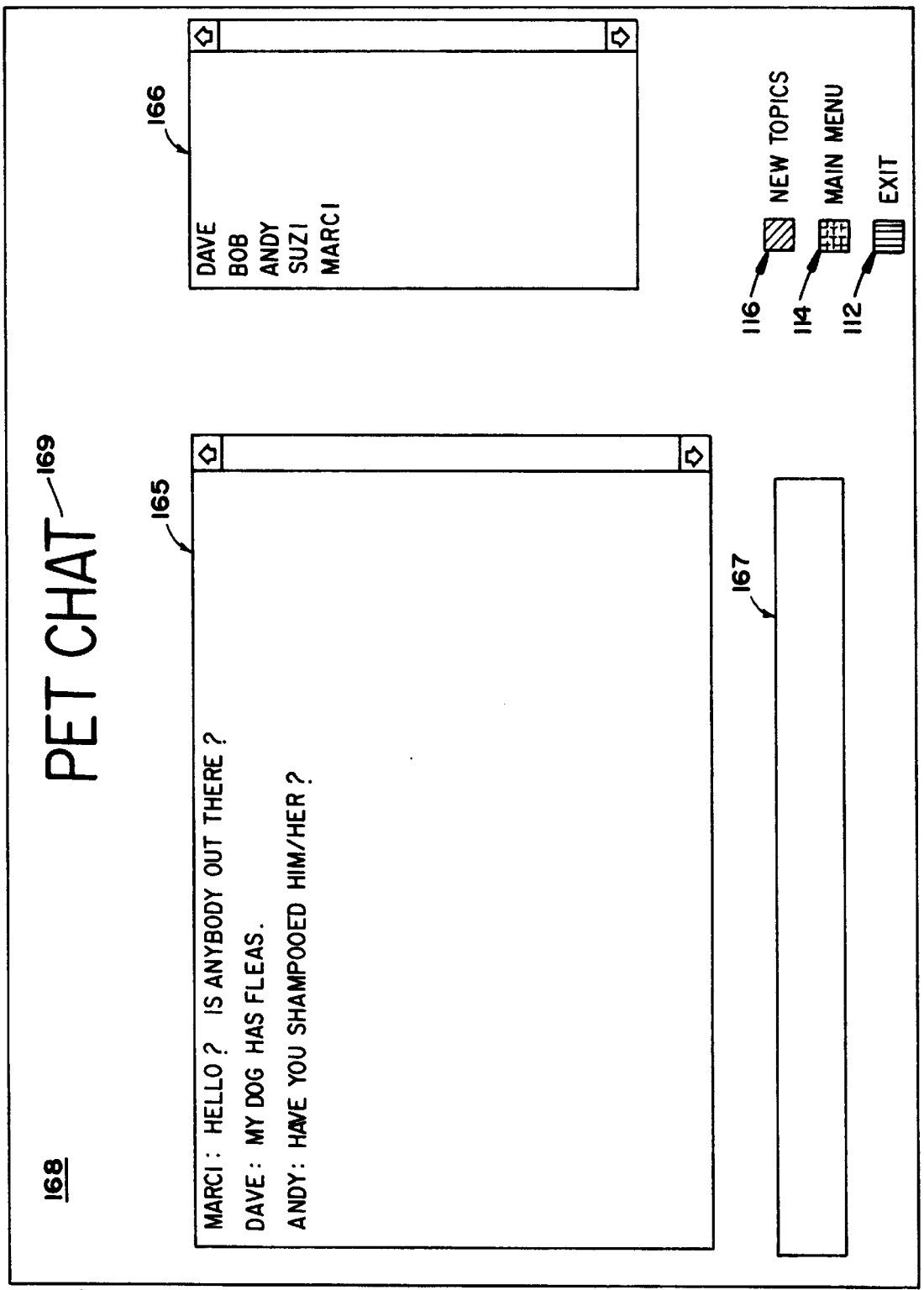
FIG. 3 is an illustration of a secondary screen display associated with the primary screen display shown in FIG. 2 which shows how the definition assigned to each colored icon can be maintained consistent throughout each screen display level.

FIG. 3 illustrates a secondary screen display 168, entitled PET CHAT, which is subordinate to the primary screen display 160 shown in FIG. 2. Screen display 168 represents, in general, a typical chat room available on the Internet, having a title 169, a conversation module 165, a user list module 166, and an input module 167. With this particular arrangement, a user can monitor the ongoing conversation by reading the contents of the conversation module 165 and selectively interject responses, comments, and the like by inputting them into the input module 167 for transmission to the conversation module 65. For convenience, the user list module 166 is provided to allow a user to identify all the various other individuals that are participating in the on-line conversation. In accordance with the present invention, the secondary screen display 168 also contains a plurality of colored instructional icons which, on this screen display, includes the red instructional icon 112, the yellow instructional icon 114, and the green instructional icon 116. Providing the red, yellow, and green instructional icons 112, 114, 116 on screen display 168 enables a user to quickly and easily decide what operational activities to undertake to accomplish their particular Internet goals. To be more specific, a user desirous of exiting the Internet need only select either the red function key 102 or the corresponding red instructional icon 112. In similar fashion, a user may exit the CHAT subject heading and return to the main menu by simply selecting either the yellow function key 104 or the yellow instructional icon 114, while a user may choose a new topic within the CHAT subject heading by simply selecting the green function key 106 or the green instructional icon 116. It can be seen, then, that by providing the combined instructional features of the colored function keys and matching instructional icons, the present invention provides a two-dimensional simplification technique for facilitating the operation of the Internet access device which can be used by virtually any potential user, regardless of their level of experience.

Figure 4:
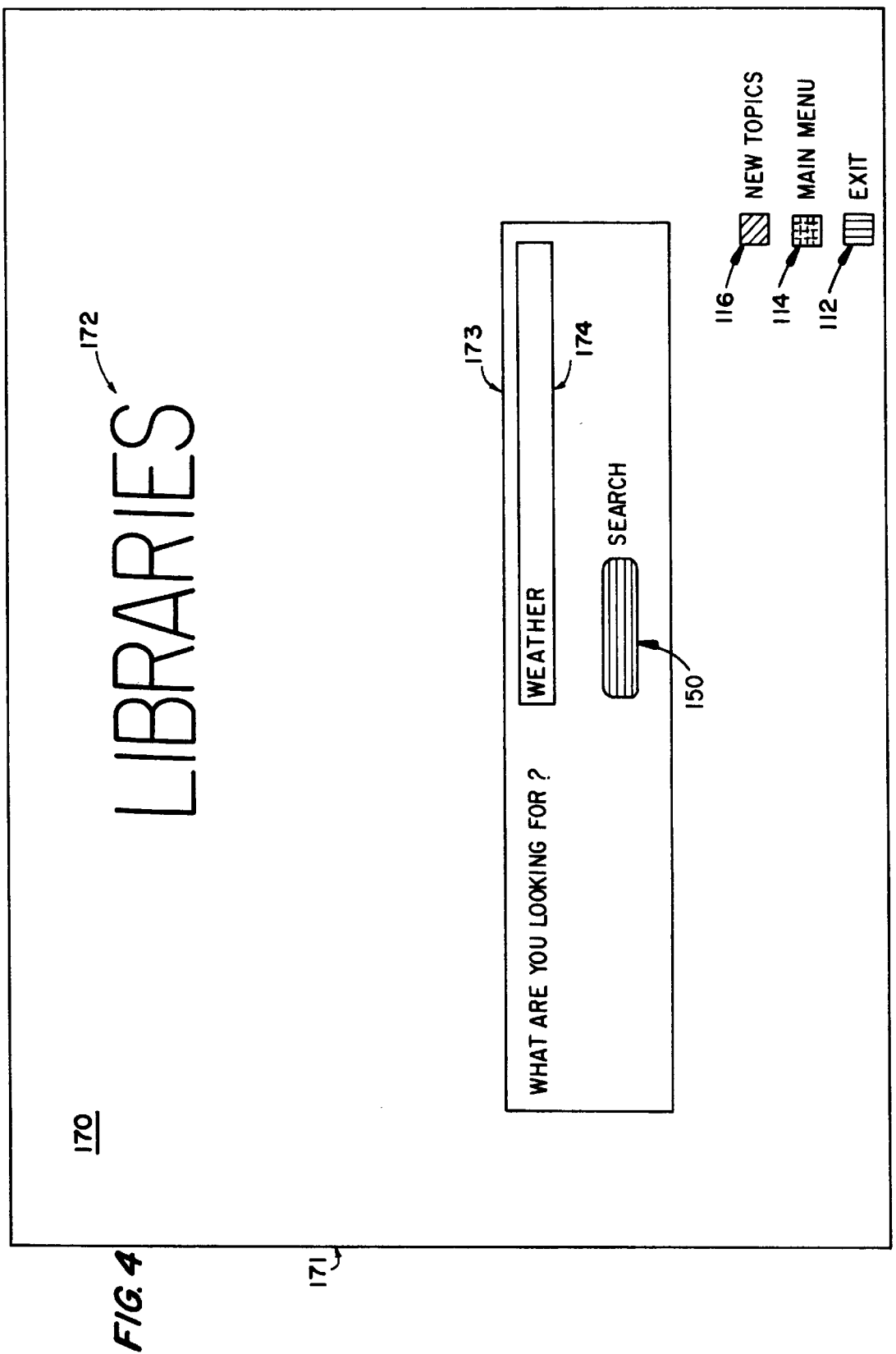
FIGS. 4 and 5 are illustrations of an alternative primary screen and display associated secondary screen display having the colored icons.

Referring now to FIG. 4, illustrated is a primary screen display 170 for the LIBRARIES main subject heading.

Similar to the above example, the screen of the video display unit is represented generally by a border 171 and includes therewithin a heading title 172, a query module 173, and the colored instructional icons 112, 114, 116, 118 of the present invention. The query module 173 contains a message prompt asking the user what topic they wish to research in combination with a data entry module 174 for communicating the desired research topic to the application software within the Internet access device. In the example shown, the user has input the research topic "weather" has been input into the data entry module 174. Once again, to quickly and easily initiate the desired research, the user need only select either the blue function key 108 (shown in FIG. 1) or the blue instructional icon 118 provided on the primary screen display 170. Also in accordance with the present invention, the remaining instructional icons 112, 114, 116 are provided in combination with the correspondingly colored function keys 102, 104, 106 on the keyboard assembly 100 of FIG. 1 to allow the user to abort and/or refocus the particular research endeavor through simple color association.

Figure 5:
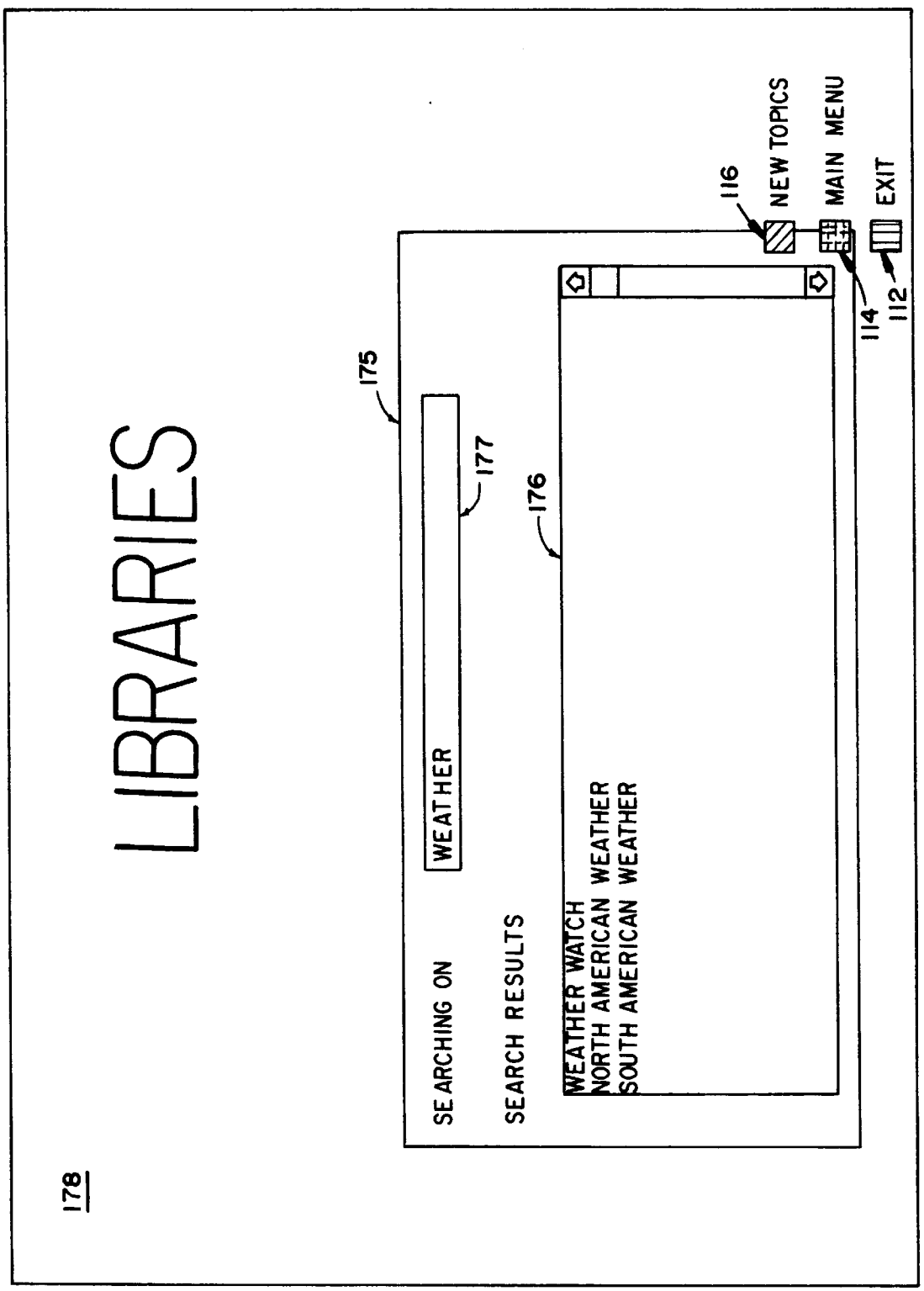

Once the blue instructional set has been selected via function key 108 or instructional icon 118, the application program of the Internet access device will perform the requested search and progress to a subordinate screen display, such as the secondary screen display 178 shown in FIG. 5. As can be seen, this screen display 178 contains a main module 175 having a research topic module 177 for displaying the current topic being researched, and a search results module 176 for listing the results of the desired research. From this point, the user can selectively call up the results for each of the various sub-topics listed in the results module 176 by using a mouse or any other selection means. More important to the present invention, however, are the colored instructional icons 112, 114, 116 disposed on the secondary screen display 178. As noted above, these colored instructional icons complement the red function key 102, the yellow function key 104, and the green function key 106, respectively, to produce a red instructional set, a yellow instructional set, and a green instructional set, respectively. With the color red defined to initiate an exiting function, the color yellow defined to return the user to the main menu, and the color green defined to select a new topic within the particular main subject heading, a user may simply and easily undertake these operational activities by merely selecting the function key or the instructional icon from the appropriate red, yellow, or green instructional set. Again, this definitional universality allows a user to quickly and easily operate the application software of the Internet access device based on simple color association. Moreover, by matching each colored function key with an identically colored instructional icon, the user is offered complementary instructional features for effectuating or initiating the various operations or functions. This dual or "two dimensional" offering of the present invention substantially increases the likelihood that a user can quickly and easily learn and master the operation of the particular computing system with minimal memorization.

Figure 6:
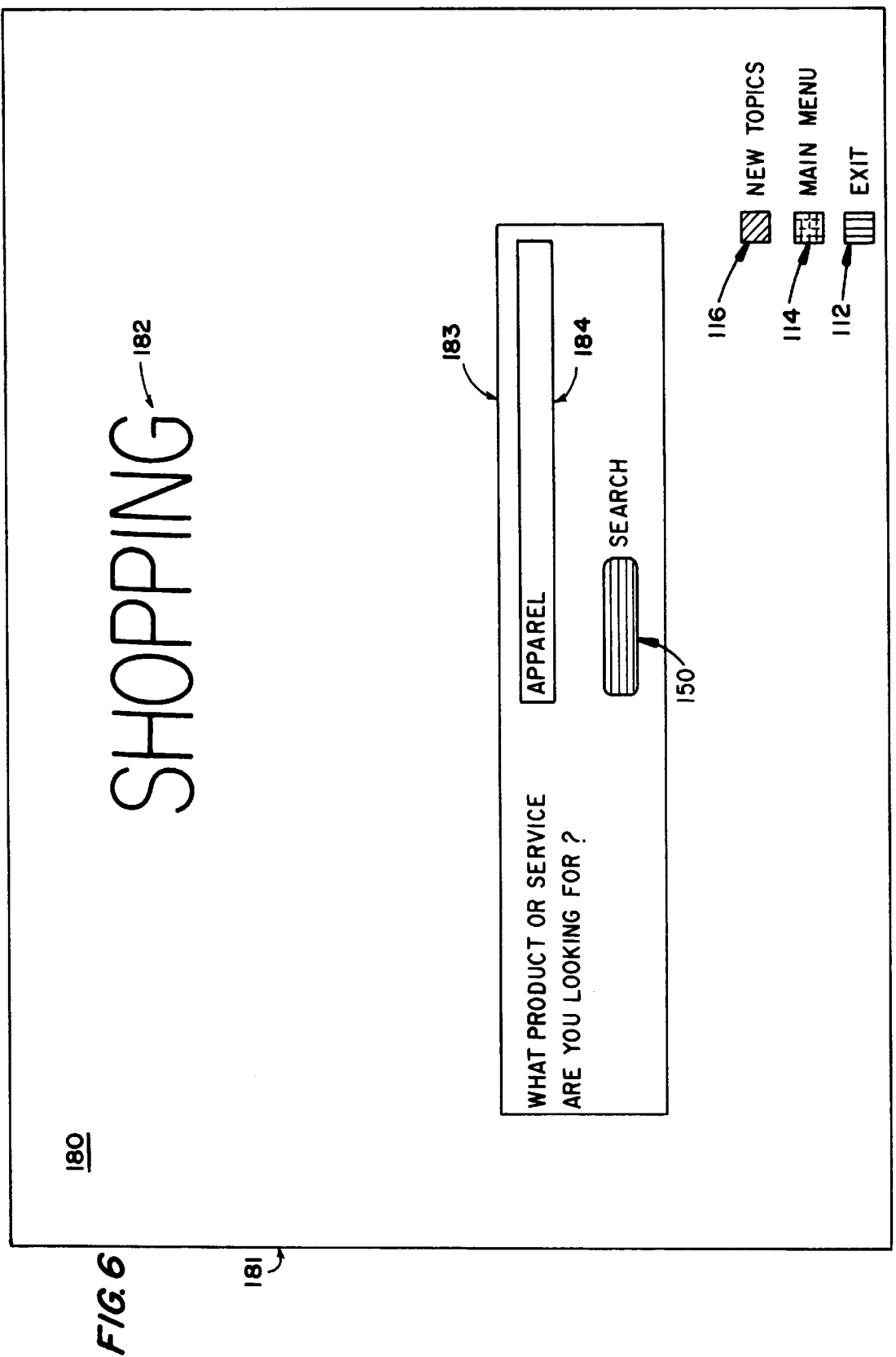
FIGS. 6 and 7 is an illustration of another alternative primary screen display and associated secondary screen display having the colored icons.
Figure 7:
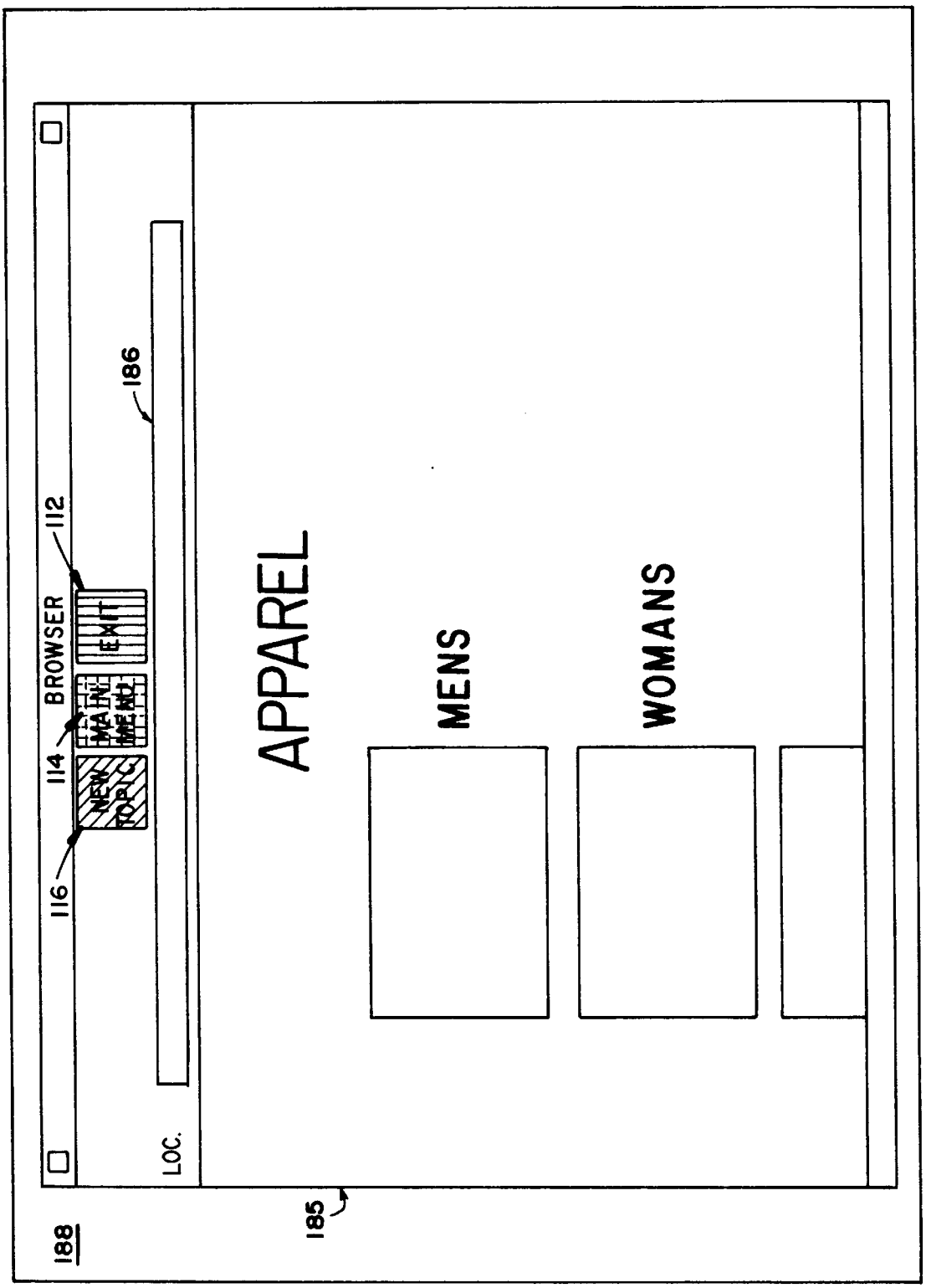

Moving on, FIGS. 6 and 7 illustrate a primary screen display 180 and a secondary screen display 188, respectively, for the SHOPPING category of the Internet access device. An with the previous primary screen displays, the primary screen display 180 has a border 181 and includes a heading title 182, a query module 183, and the colored instructional icons 112, 114, 116, 118 of the present invention. In this case, however, the query module 183 contains a message prompt asking the user what product or service they would like to look for. A data entry module 184 is also provided within the query module 183 for communicating the desired research topic to the application software within the Internet access device. In this example, with the word "apparel" chosen as the product to be researched, the selection of either the blue function key 108 or the blue instructional icon 118 of the blue instructional set will initiate the search for apparel products. FIG. 7 represents a typical example of a secondary screen display 188 resulting from the aforementioned search for apparel products. Unlike the above-mentioned secondary screen displays 168, 178, the secondary screen display 188 has a browser module 185 for viewing the various pre-established home pages available on the Internet. For convenience, an address location module 186 is provided within the browser module 185 to indicate the address of each particular home page that is being visited during an access session. An additional difference resides in the location of the colored instructional icons 112, 114, 116, which are provided at the top of the screen display 188 within the browser module 185, rather than at the bottom of the screen displays, as with the secondary screen displays 168, 178.

This variation in positioning evidences that the location of the various instructional icons on each screen display is neither crucial nor relevant to the present invention.

Rather, the quintessential feature of the present invention resides in the two-dimensional uniform color coded user interface scheme formed by matching the colored instructional icons 112, 114, 116, 118 with the correspondingly colored function keys 102, 104, 106, 108 and defining each of these colors to represent a separate and distinct function where each definition remains constant throughout the entire application program. By providing this simplified user interface, the present invention opens the proverbial door to virtually every potential user regardless of their level of experience or degree of competence with computing systems and the like. In this age of rapidly advancing technology, such an user interface scheme will ensure that computing systems employing the same interface will be readily approachable and understandable by the common or inexperienced user such that a greater number of people will be able to operate and master such computing systems.

Figure 8:
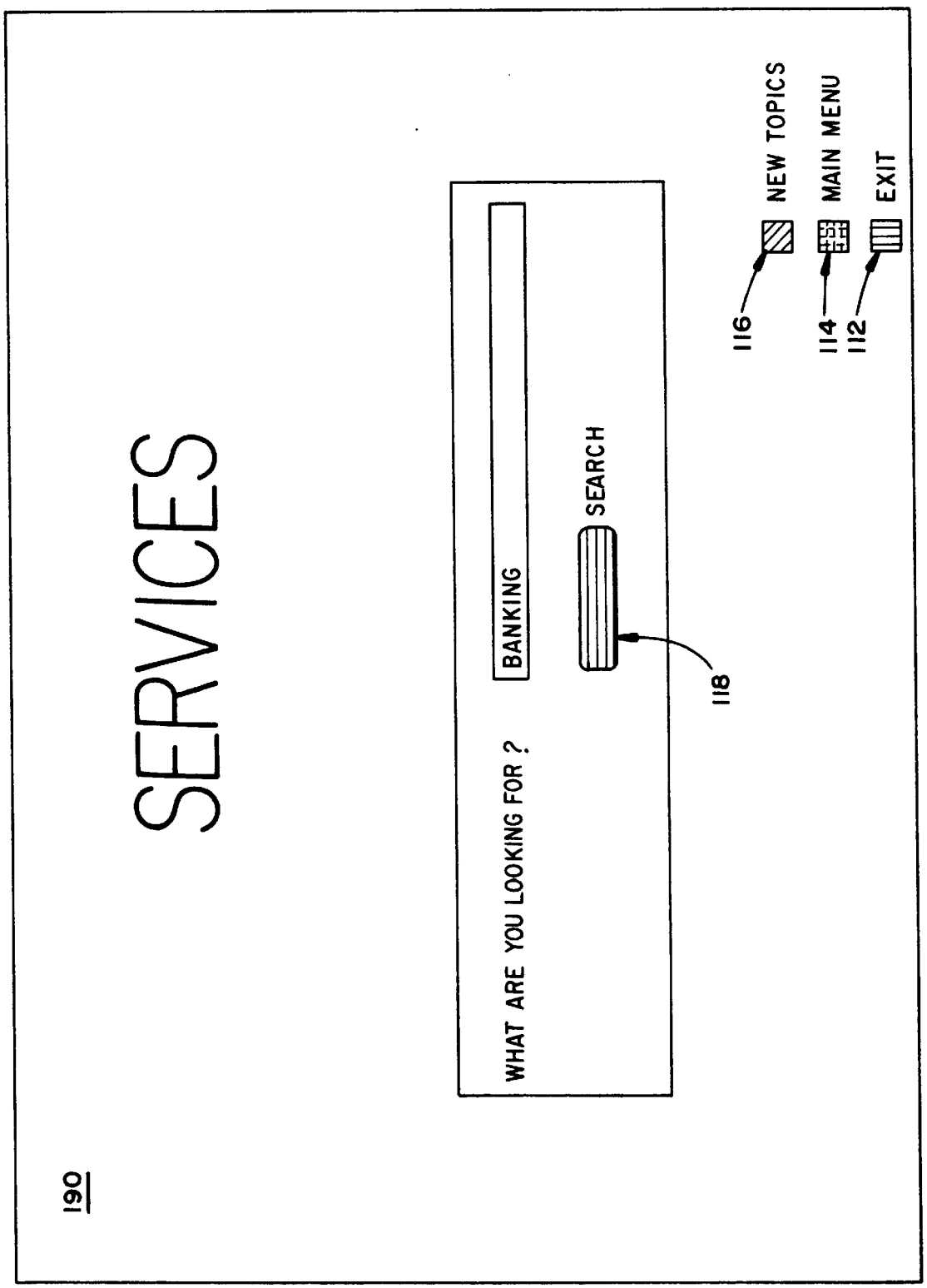
FIGS. 8, 9, and 10 are illustrations of still another primary screen and associated secondary as well as a tertiary screen display having the colored icons.
Figure 9:
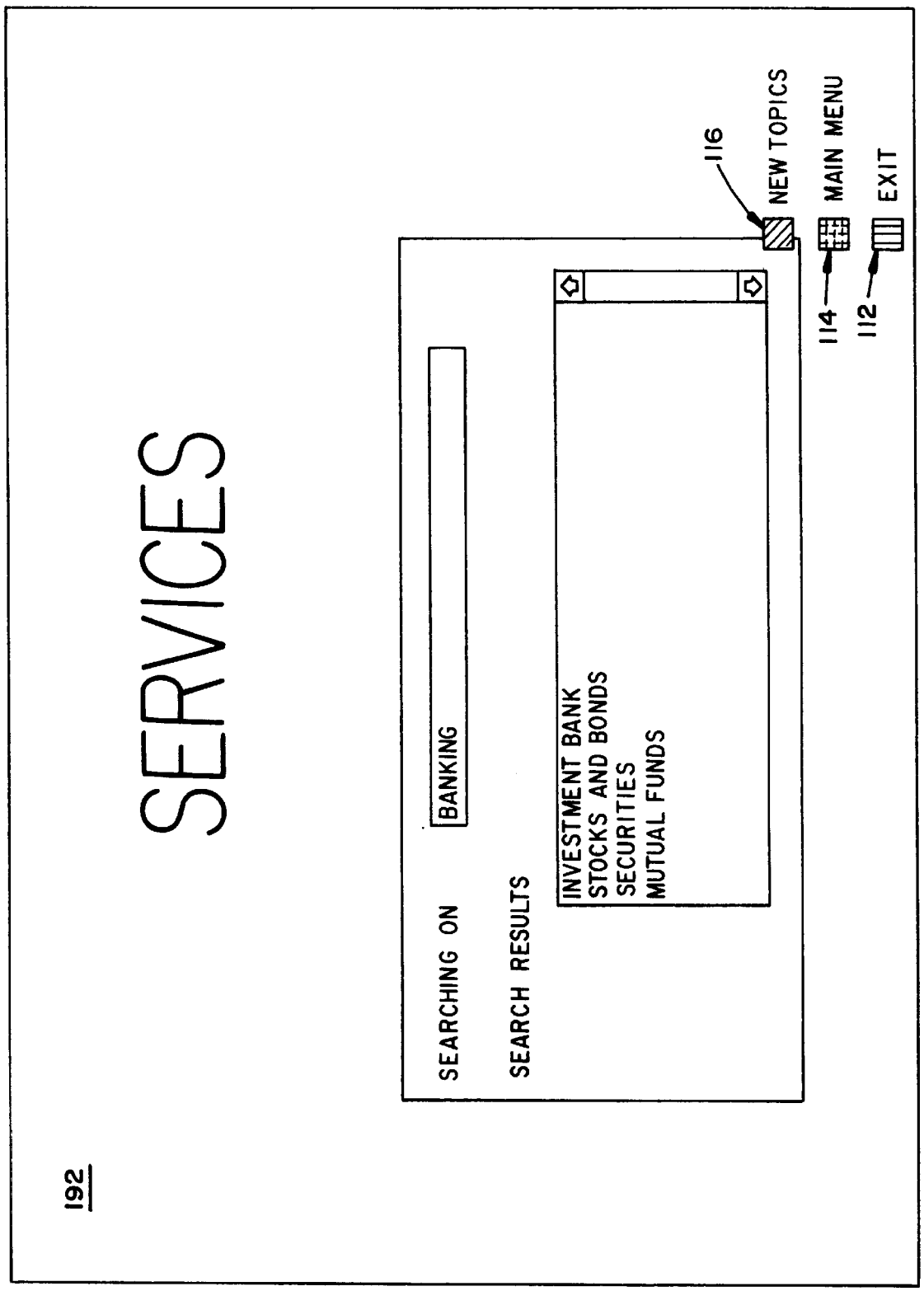
Figure 10:
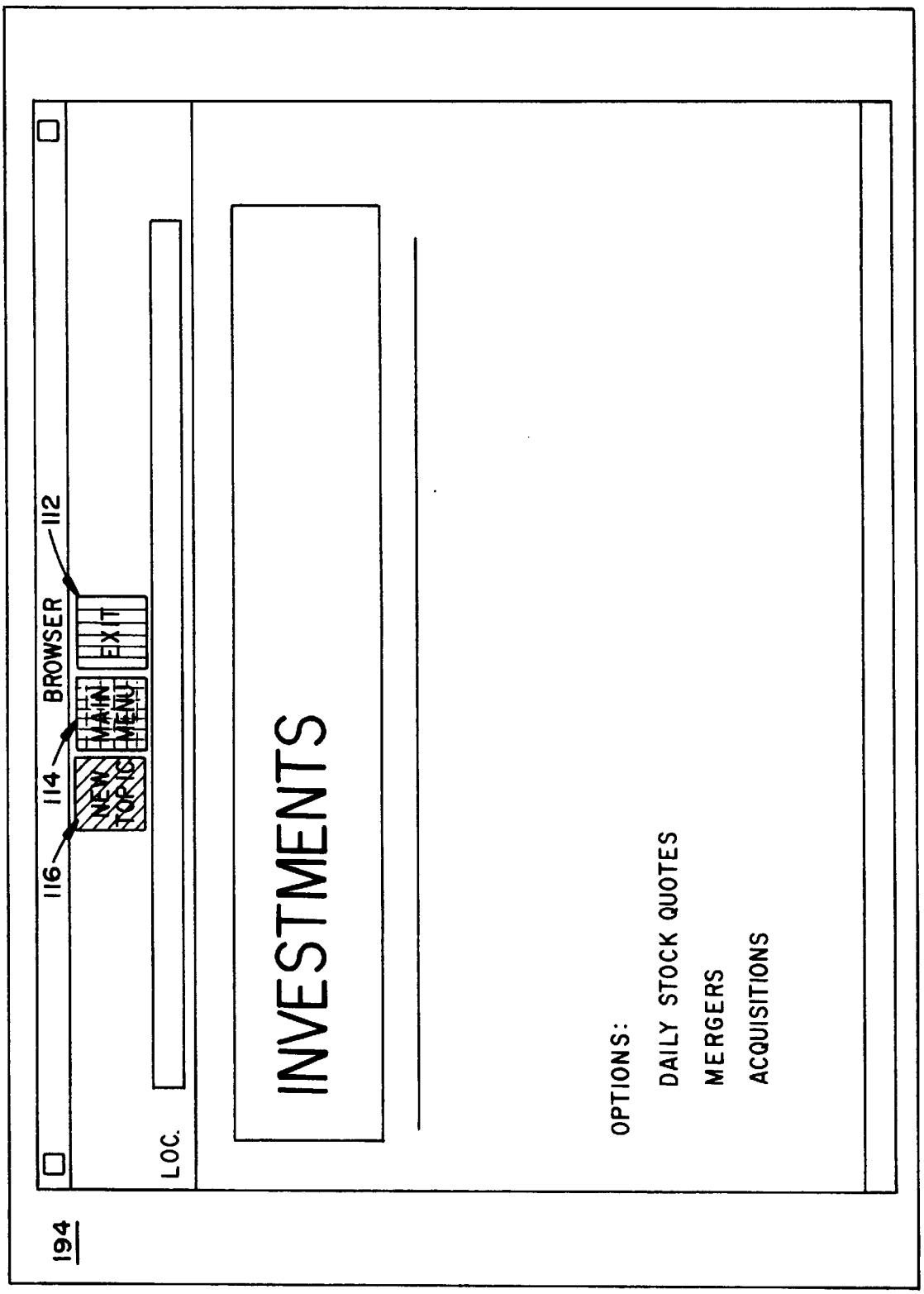
Figure 11:
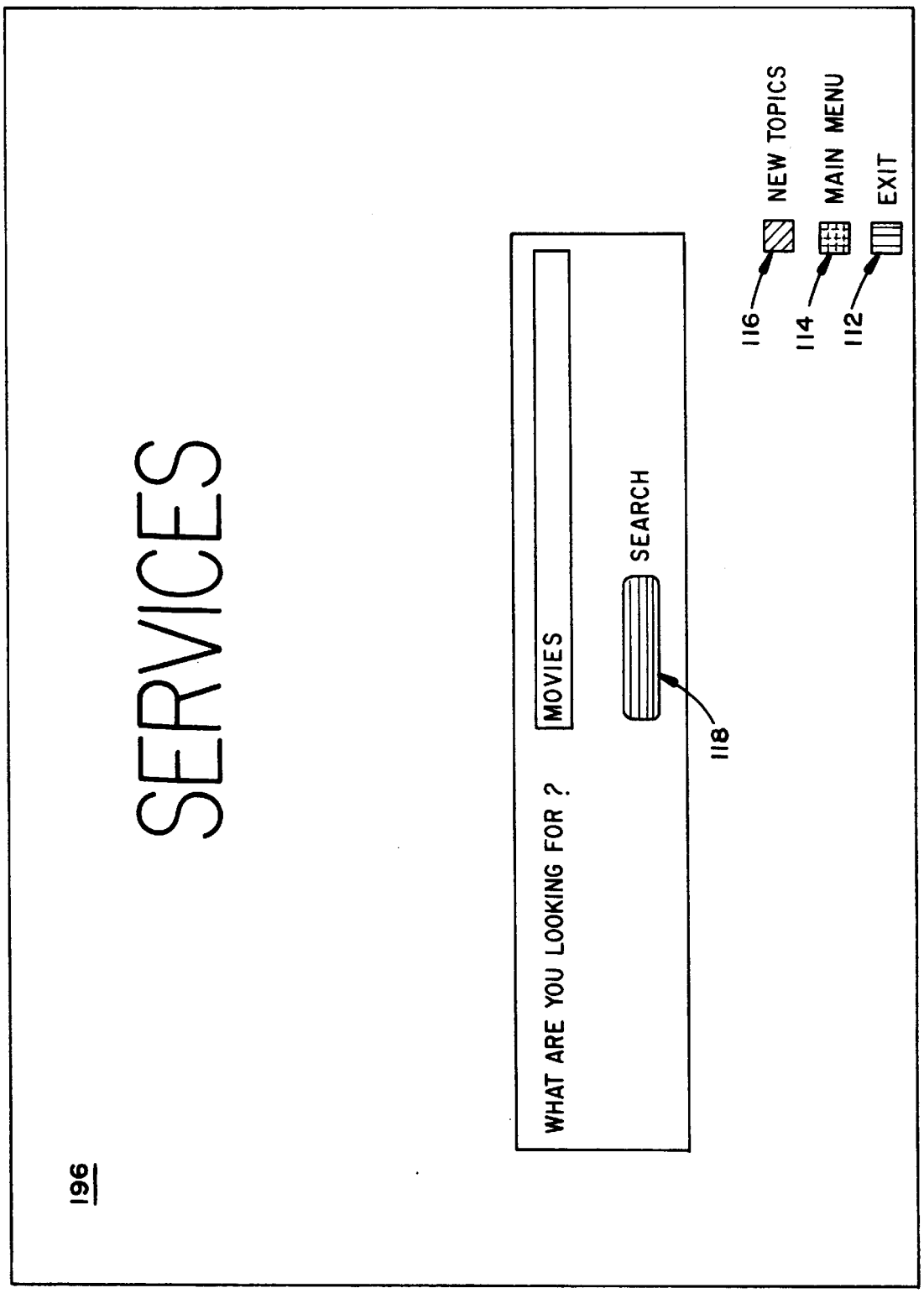
FIG. 11 illustrates the primary screen display shown in FIG. 8, having a modified search topic.
Figure 12:
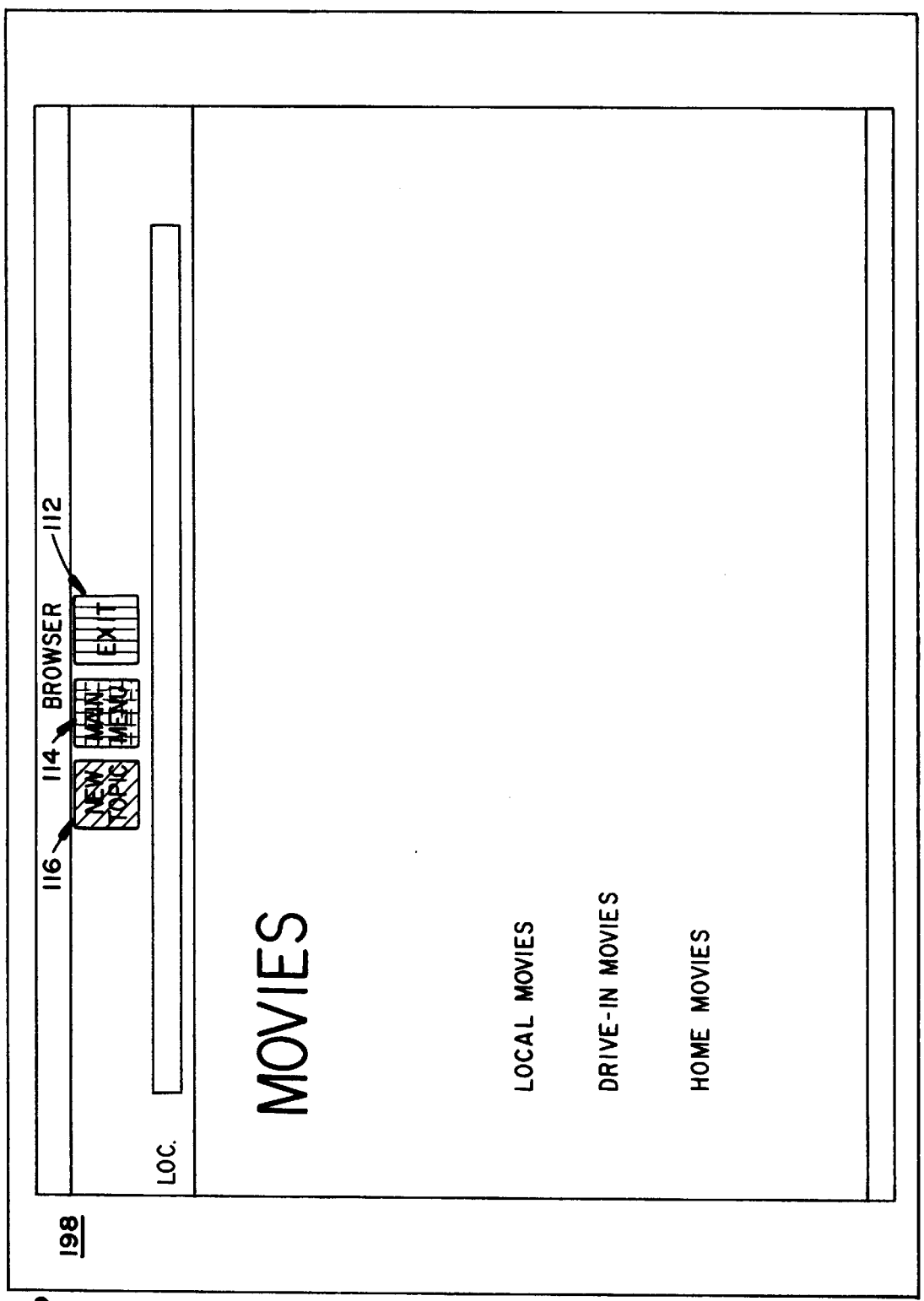
FIG. 12 is an illustration of a secondary screen display associated with the search results of the search topic shown in FIG. 11 which also includes the colored icons.

The remaining category of the Internet access device is the SERVICES category, illustrated with the various screen displays shown in FIGS. 8–12. More particularly, FIGS. 8–10 illustrate a first research endeavor within the SERVICES category focusing on banking services, while FIGS. 11–12 illustrate a second research endeavor within the SERVICES category focusing on movie services. This seemingly duplicative exercise further highlights the feature of providing colored instructional icons on each screen display encountered during the course of an Internet access session. As noted above, the various colored instructional icons, when coupled to the correspondingly colored function keys disposed on the keyboard assembly 100 of FIG. 1, form a plurality of color coded instructional sets for facilitating the operation of the Internet access device. Each individual color has a definition that is universal throughout the entire application. As such, a user desirous of initiating a particular function need only engage the function key or the instructional icon from the appropriately colored instructional set. Those skilled in the art will therefore appreciate that the present invention, by providing the combined user interface features of the colored function keys and matching instructional icons, offers a two-dimensional simplification technique for facilitating the operation of the Internet access device which can be used by virtually any potential user, regardless of their level of experience.

In light of the foregoing, the present invention solves the various drawbacks found in the prior art. To be more specific, the present invention provides a color coded user interface scheme for computing systems and the like which provides a two dimensional simplification technique with substantive improvements to both the keyboard/keypad assembly and the various screen displays on the video display units such that the particular computing system is easy to learn, master, and operate for any potential user, regardless of their level of experience with computers and high technology. The user interface scheme of the present invention is simple, straightforward, and easy to learn with complementary color coding on both the keyboard/keypad assembly and the various screen displays so as to advantageously narrow the ever increasing gap between those individuals who are computer literate and computer illiterate. As such, the color coded user interface scheme of the present invention will render a larger number of individuals capable of operating and mastering such computing systems.

The present invention also solves the drawbacks in the prior art by providing a remarkably "user friendly" user interface scheme which minimizes the amount of memorization and/or study effort required to operate and master the particular computing system which employs said instructional scheme. By providing such a "user friendly" simplification technique, this will advantageously ensure that people can readily understand, grasp, and master the particular computing system so as to exploit the available technology. Moreover, providing such a "user friendly" instructional scheme will also advantageously serve the higher goal of increasing the user base for the particular computing system, potentially translating into increased profits and an elevated market presence.

Figure 13:
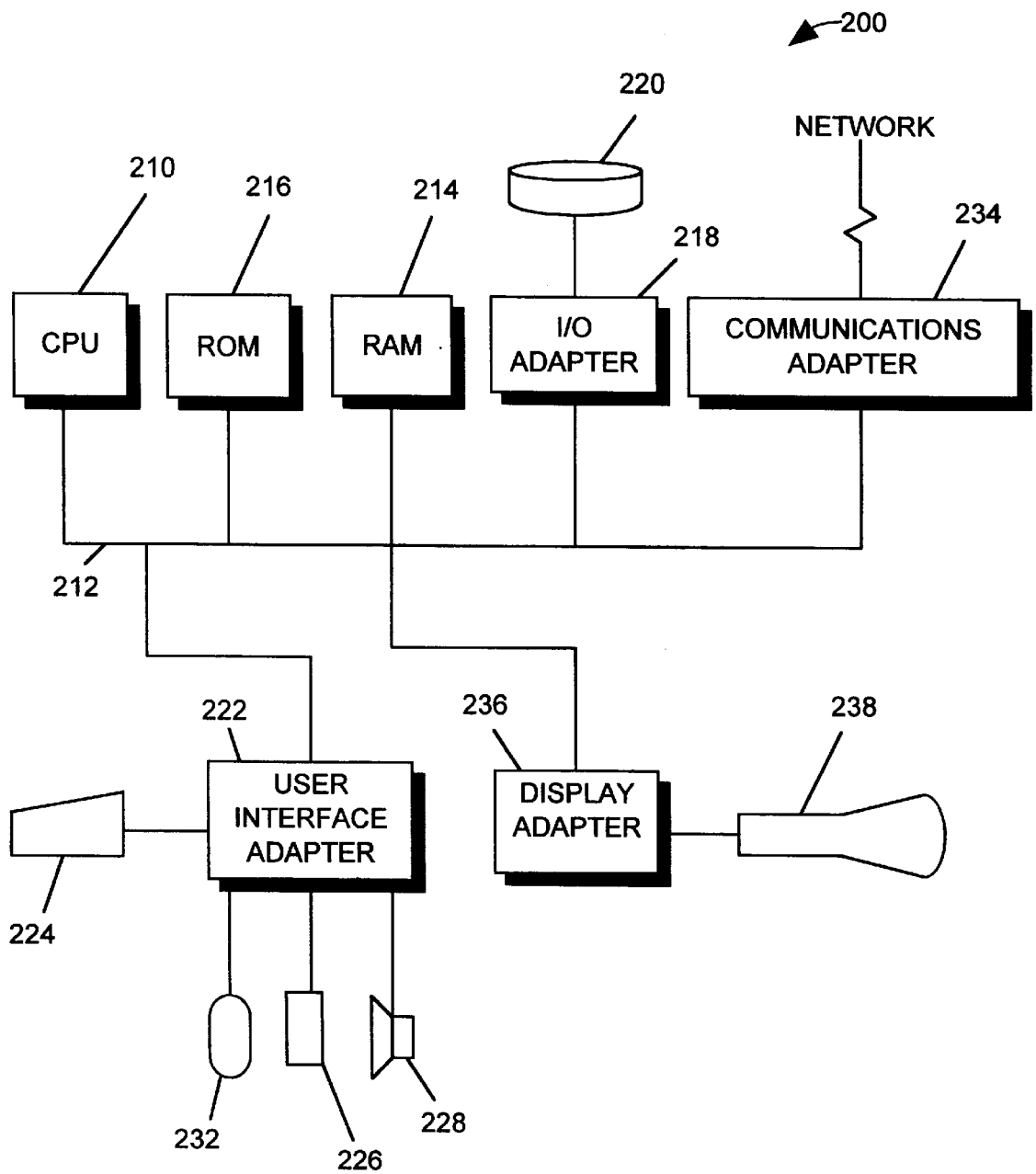
FIG. 13 is a block diagram of a computer system in accordance with a preferred embodiment of the present invention capable of practicing the color coded user interface shown in FIGS. 1 through 12.

Referring now to FIG. 13, a system 200 is shown capable of performing the color coded user interface detailed in FIGS. 1 through 12. The preferred embodiment of the present invention is preferably practiced in the context of an operating system resident on a workstation or personal computer such as the Sun Microsystems® Sparc Station®, IBM® PS/2® or Apple® Macintosh computer. A representative hardware environment is depicted in FIG. 13, which illustrates a typical hardware configuration of a workstation in accordance with the preferred embodiment having a central processing unit 210, such as a microprocessor, and a number of other units interconnected via a system bus 212. The workstation shown in FIG. 13 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch pad or touch screen (not shown) to the bus 212, communication adapter 234 for connecting the workstation to a communication network (e.g., a data processing network, a bulletin board service, or the Internet) and a display adapter 236 for connecting the bus 212 to a display device 238. The workstation typically has resident thereon an operating system such as UNIX®, the Microsoft® Windows 95, NT or CE operating system, the IBM OS/2® operating system or the Apple MacOS® operating system.

It should be noted that other computer systems which incorporate a subset of the above described hardware components could be configured to implement the color coded user electronic interface between an end user and a computer system. Such a simplified computing system 200 would need to include a graphical user interface adapter 236 that presents information to the user from the computer system 200 on a display device 238. This information preferably includes one or more instructional icons having associated therewith a computer system operation from one of several different predetermined functional categories and a corresponding color associated with that category. The system 200 also preferably includes a user input device adapter 222 that receives data input by the user from which user instructions for initiating a computer system procedure and other user input. This user input device adapter 222 preferably is coupled to a keyboard 224 or keypad having a function key which corresponds in color to each of the plurality of instructional icons. A controller 210 operatively coupled to the graphical user interface adapter 236 and user input device adapter 222 to control the interactions of the various parts of the system 200. Initiation of computer system procedures from one of the different predetermined functional categories are controlled by the controller 210 based on which function key is actuated by the user or which icon is selected on the screen display by the mouse or trackball. In this way, the user can associate and initiate computer system procedures based on a uniform color coding scheme of associated instructional icons and function keys.

The user input device adapter 222 also preferably includes a icon selecting device (e.g., a mouse 226 or touchpad) for indicating to the controller 210 a selection of one of the instructional icons. In response to this icon selection, the controller 210 initiates a computer system procedure from one of the different predetermined functional categories. In this manner, the controller 210 is programmed to initiate a particular computing system procedure of the computer system in response to either a selection a particular colored instructional icon or an actuation of a corresponding similarly colored function key.

This simplified color coded interface based system 200 can be readily incorporated into personal computers. In such an environment, the computer system procedures described above would be several commands in an application program (e.g., a word processor, spreadsheet, or world wide web browser) which can be executed on the personal computer.

This simplified color coded interface based system 200 can be adapted for use in several other types of environments. For example, the computer system 200 could be an interactive content/access provider environment (an Internet service provider or an online service like America Online®, Compuserve® or Prodigy®) which is operatively coupled to an end user with a computer or television set top box through an interactive communication network. The interactive communication network may be a data bus, a public switched telephone network (PSTN), a public data network, a private data network, or a wireless data service which is carried over a wireless radio link, a data modem, a cable modem, fiber optic cable, or other physical data network connection. The user interactions with the content provider would be simplified by using the color coded user interface described above. In such a system 200, a communication mechanism or adapter 234 would be operatively coupled to the controller 210 for communicating data between the user and the content provider via the interactive communication network.

This content provider also may be a host computer which acts as a gateway that interfaces to several other content providers to provide data to the color coded user interface system via the interactive network from the several other content providers.

Another environment for this simplified color coded interface based system 200 is in client-server computing. The graphical user interface, user input device, and controller together could form a client computing device which is operatively coupled through an interactive network to a server which executes a process that performs functions for the user. These client-server environments include Internet appliance devices utilizing world wide web browsers such as Netscape® or Microsoft Internet Explorer® and may include providing more sophisticated features to a user by executing interpreted software code such as Sun Microsystem's Java® applets. In addition, the recently developed Microsoft Windows CE® operating system for network computers and other less complicated devices could be adapted to use the above described color coded user interface system.

As previously noted, several environments could incorporate the preferred embodiment color coded user interface. These include the following physical arrangements of the three basic system 200 components (i.e., the graphical user interface, the user input device, and the controller). In a first physical arrangement, the three components are placed within a single housing having a keyboard 224 including the color coded function keys with the controller 210 and graphical user interface adapter 236 built into the keyboard housing.

In a second physical arrangement, all of the component of the first physical arrangement are packaged together with a display device such as a electronic display monitor or liquid crystal display (LCD). Products such as video tape players, stereos, televisions, navigation systems like global position system receivers (GPS), microwaves, clocks, facsimile machines, radio telephones, pagers, exercise equipment, and sewing machines could be adapted to utilize this color coded user interface system.

In a third physical arrangement, the three components could be packaged in two separate housings, The first housing could include the user input device and the second housing could include the graphical user interface connected via a communication link maintained by the controller. In such an arrangement the operations of the controller could be split between two controller with one controller being located in each housing. This third physical arrangement could be adapted into a fourth physical arrangement by having a display device included with the graphical user interface in the second housing. An example of this type of product in the third physical arrangement is a television set top box which connects to the television and a telephone line which is coupled by an infrared communication link to a remotely located keyboard. In the fourth physical arrangement, the television manufacturer incorporates the graphic user interface into the television set.

The color coded user interface system 200 is generally directed to a uniform color coding scheme for display icons and keys on a key board. The preferred embodiment scheme includes several functional categories with a corresponding color such as: (1) a red icon and a red function key associated with an "exit/quit" predetermined functional category, (2) a yellow icon and a yellow function key associated with a "go back/stop" predetermined functional category, (3) a green icon and a green function key associated with a "go forward/new" predetermined functional category, and (4) a blue icon and a blue function key associated with a "search/start" predetermined functional category.

This uniform color coding scheme can be further refined in an alternative embodiment of the present invention where: (1) a red icon and a red function key are associated with an "exit program" computer system procedure, (2) a yellow icon and a yellow function key are associated with a "go back to main menu" computer system procedure, (3) a green icon and a green function key are associated with a "new topic" computer system procedure, and (4) a blue icon and a blue function key are associated with a "initiate search" computer system procedure.

In addition, this uniform color coding scheme can be further refined in an alternative embodiment of the present invention where: (1) a red icon and a red function key are associated with an "exit program" computer system procedure, (2) a yellow icon and a yellow function key are associated with a "go back to beginning of program" computer system procedure, (3) a green icon and a green function key are associated with a "go forward" computer system procedure, and (4) a blue icon and a blue function key are associated with a "start" computer system procedure.

Figure 14:
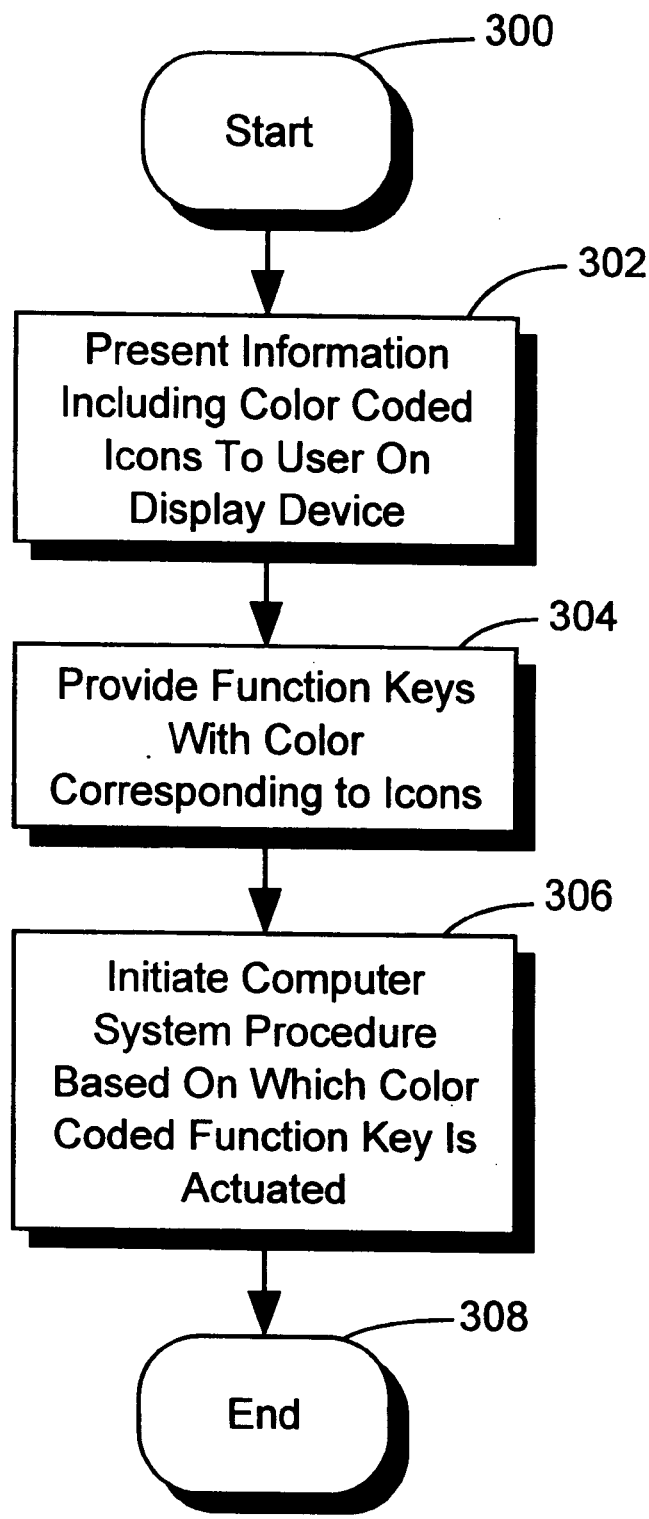
FIG. 14 is a flowchart of the preferred embodiment color coded interface method used in the computer system shown in FIG. 13.

The present invention can be summarized in reference to FIG. 14 which is a flowchart of the preferred embodiment steps of the color coded user interface method for use between an end user and a computer system. This method is performed by device-implemented steps in a series of distinct processing steps 300–308 that can be implemented in one or more processors. Initially, information is presented 302 to the user from the computer system 200 on a display device 238. This information includes several instructional icons where each icon has associated therewith a computer system procedure from a different predetermined functional category and a corresponding color for that functional category. Function keys are provided 304 on a user input device like a keyboard 224. Each of these function keys have a color corresponding to each of the instructional icons. Subsequently, a computer system procedure is initiated 306 from one of the different predetermined functional categories based on which function key is actuated on the user input device by the user such that the user can associate and initiate computer system procedures based on a uniform color coding scheme of associated instructional icons and function keys.

In addition, a program storage device may be created which is readable by a computer system tangibly embodying a program of instructions executable by the computer system. This program of instructions would perform one or more parts of the color coded electronic user interface system described above.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A color coded electronic user interface system for use between an end user and a computer system comprising:

(a) a graphical user interface that presents information to the user from the computer system on a display device, the information comprising a plurality of instructional icons for a plurality of display screens, each of the plurality instructional icons having associated therewith a computer system display screen navigating operation from a different predetermined functional category and a corresponding color, at least a first instructional icon of the plurality of instructional icons being associated with an identical functional category and an identical corresponding color as a second instructional icon of the plurality of instructional icons, the first and second instructional icon being associated with a first and second display screen of the plurality of display screens, respectively, such that a uniform color coding scheme is provided which has icons on different display screens being associated with identical functional categories when associated with identical corresponding colors;

(b) a user input device that receives data input by the user from which user instructions for initiating a computer system procedure and other user input is obtained, the user input device comprising a function key which corresponds in color to each of the plurality of instructional icons; and (c) a controller, operatively coupled to the graphical user interface and user input device, that initiates a computer system procedure from one of the different predetermined functional categories based on which function key is actuated on the user input device by the user such that the use can associate and initiate computer system display screen navigating procedures based on the uniform color coding scheme of associated instructional icons and function keys.

2. The color coded user interface system of claim 1 wherein the computer system comprises a content/access provider operatively coupled with the color coded user interface system through an interactive communication network.

3. The color coded user interface system of claim 2 further comprising a communication mechanism, operatively coupled to the controller, for communicating data between the user and the content provider via the interactive communication network.

4. The color coded user interface system of claim 2 wherein the content provider comprises a host which interfaces to a plurality of content providers to provide data to the color coded user interface system via the interactive network from the plurality of content providers.

5. The color coded user interface system of claim 2 wherein the interactive communication network is selected from the group consisting of: a data bus, a public switched telephone network (PSTN), a public data network, a private data network, and a wireless data service.

6. The color coded user interface system of claim 1 wherein the graphical user interface, user input device, and controller together form a client computing device which is operatively coupled through an interactive network to a server which executes a process that performs functions for the user.

7. The color coded user interface system of claim 1 wherein the graphical user interface, user input device, and controller are configured together in a physical arrangement selected from a group consisting of:

(a) a single housing having a keyboard including the plurality of function keys;

(b) single mechanism having a keyboard including the plurality of function keys and the display device;

(c) a first housing including the user input device and a second housing including the graphical user interface connected via a communication link maintained by the controller; and (d) a first housing including the user input device and a second housing including the graphical user interface and the display device connected via a communication link maintained by the controller.

8. The color coded user interface system of claim 1 wherein the controller comprises a first processor and a second processor which together perform the operations of the controller, the first and the second processor being located in separate physical housings from one another an operatively coupled together by a communication link.

9. The color coded user interface system of claim 1 wherein the computer system comprises a personal computer and wherein the computer system procedures comprise a plurality of commands in an application program which can be executed on the personal computer.

10. The color coded user interface system of claim 1 wherein uniform color coding scheme comprises: (1) a red icon and a red function key associated with an "exit/quit" predetermined functional category, (2) a yellow icon and a yellow function key associated with a "go back/stop" predetermined functional category, (3) a green icon and a green function key associated with a "go forward/new" predetermined functional category, and (4) a blue icon and a blue function key associated with a "search/start" predetermined functional category.

11. The color coded user interface system of claim 10 wherein uniform color coding scheme comprises: (1) a red icon and a red function key associated with an "exit program" computer system procedure, (2) a yellow icon and a yellow function key associated with a "go back to main menu" computer system procedure, (3) a green icon and a green function key associated with a "new topic" computer system procedure, and (4) a blue icon and a blue function key associated with a "initiate search" computer system procedure.

12. The color coded user interface system of claim 10 wherein uniform color coding scheme comprises: (1) a red icon and a red function key associated with an "exit program" computer system procedure, (2) a yellow icon and a yellow function key associated with a "go back to beginning of program" computer system procedure, (3) a green icon and a green function key associated with a "go forward" computer system procedure, and (4) a blue icon and a blue function key associated with a "start" computer system procedure.

13. The color coded user interface system of claim 1 wherein the user input device further comprises a icon selecting device for indicating to the controller a selection of one of the instructional icons and wherein the controller initiates a computer system procedure from one of the different predetermined functional categories based on the indicated instructional icon selection.

14. The color coded user interface system of claim 13 wherein the controller is programmed to initiate a particular computing system procedure of the computer system in response to one of: selecting a particular colored instructional icon and actuating a corresponding similarly colored function key.

15. A color coded electronic user interface method for use between an end user and a computer system, the method comprising steps of:

(a) presenting information to the user from the computer system on a display device, the information comprising a plurality of instructional icons for a plurality of display screens, each of the plurality instructional icons having associated therewith a computer system display screen navigating procedure from a different predetermined functional category and a corresponding color, at least a first instructional icon of the plurality of instructional icons being associated with an identical functional category and an identical corresponding color as a second instructional icon of the plurality of instructional icons, the first and second instructional icon being associated with a first and second display screen of the plurality of display screens, respectively, such that a uniform color coding scheme is provided which has icons on different display screens being associated with identical functional categories when associated with identical corresponding colors;

(b) providing a plurality of function keys on a user input device, each of the plurality function keys corresponding in color to each of the plurality of instructional icons; and (c) initiating a computer system display screen navigating procedure from one of the different predetermined functional categories based on which function key is actuated on the user input device by the user such that the user can associate and initiate computer system display screen navigating procedures based on the uniform color coding scheme of associated instructional icons and function keys.

16. The method of claim 15 wherein the initiating step comprises initiating a computer system procedure based on a selection of one of the instructional icons such that a controller is programmed to initiate a particular computing system procedure of the computer system in response to one of: selecting a particular colored instructional icon and actuating a corresponding similarly colored function key.

17. The method of claim 15 wherein the uniform color coding scheme comprises: (1) a red icon and a red function key associated with an "exit/quit" predetermined functional category, (2) a yellow icon and a yellow function key associated with a "go back/stop" predetermined functional category, (3) a green icon and a green function key associated with a "go forward/new" predetermined functional category, and (4) a blue icon and a blue function key associated with a "search/start" predetermined functional category.

18. The method of claim 17 wherein uniform color coding scheme comprises: (1) a red icon and a red function key associated with an "exit program" computer system procedure, (2) a yellow icon and a yellow function key associated with a "go back to main menu" computer system procedure, (3) a green icon and a green function key associated with a "new topic" computer system procedure, and (4) a blue icon and a blue function key associated with a "initiate search" computer system procedure.

19. The method of claim 17 wherein uniform color coding scheme comprises: (1) a red icon and a red function key associated with an "exit program" computer system procedure, (2) a yellow icon and a yellow function key associated with a "go back to beginning of program" computer system procedure, (3) a green icon and a green function key associated with a "go forward" computer system procedure, and (4) a blue icon and a blue function key associated with a "start" computer system procedure.

20. A program storage device readable by a computer system tangibly embodying a program of instructions executable by the computer system to perform a color coded electronic user interface method for use between an end user and a computer system, the method comprising steps of:

(a) presenting information to the user from the computer system on a display device, the information comprising a plurality of instructional icons for a plurality of display screens, each of the plurality instructional icons having associated therewith a computer system display procedure from a different predetermined functional category and a corresponding color, at least a first instructional icon of the plurality of instructional icons being associated with an identical functional category and an identical corresponding color as a second instructional icon of the plurality of instructional icons, the first and second instructional icon being associated with a first a second display screen of the plurality of display screens, respectively, such that a uniform color coding scheme is provided which bas icons on different display screens being associated with identical functional categories when associated with identical corresponding colors;

(b) providing a plurality of function keys on a user input device, each of the plurality function keys corresponding in color to each of the plurality of instructional icons;

(c) initiating a computer system display procedure from one of the different predetermined functional categories based on which function key is actuated on the user input device by the user such that the user can associate and initiate computer system display procedures based on the uniform color coding scheme of associated instructional icons and function keys.

21. The program storage device of claim 20 wherein the initiating step of the method comprises initiating a computer system procedure based on a selection of one of the instructional icons such that a controller is programmed to initiate a particular computing system procedure of the computer system in response to one of: selecting a particular colored instructional icon and actuating a corresponding similarly colored function key.

22. The program storage device of claim 20 wherein the uniform color coding scheme utilized in the initiating step of the method comprises: (1) a red icon and a red function key associated with an "exit/quit" predetermined functional category, (2) a yellow icon and a yellow function key associated with a "go back/stop" predetermined functional category, (3) a green icon and a green function key associated with a "go forward/new" predetermined functional category, and (4) a blue icon and a blue function key associated with a "search/start" predetermined functional category.

23. The program storage device of claim 22 wherein the uniform color coding scheme utilized in the initiating step of the method comprises: (1) a red icon and a red function key associated with an "exit program" computer system procedure, (2) a yellow icon and a yellow function key associated with a "go back to main menu" computer system procedure, (3) a green icon and a green function key associated with a "new topic" computer system procedure, and (4) a blue icon and a blue function key associated with a "initiate search" computer system procedure.

24. The program storage device of claim 22 wherein the uniform color coding scheme utilized in the initiating step of the method comprises: (1) a red icon and a red function key associated with an "exit program" computer system procedure, (2) a yellow icon and a yellow function key associated with a "go back to beginning of program" computer system procedure, (3) a green icon and a green function key associated with a "go forward" computer system procedure, and (4) a blue icon and a blue function key associated with a "start" computer system procedure.

* * * * *